Dec. 18, 1962 M. H. GROVE 3,068,887
VALVE CONSTRUCTION HAVING PROVISIONS FOR VALVE SEAT ACCESS
Filed Aug. 24, 1960 3 Sheets-Sheet 1
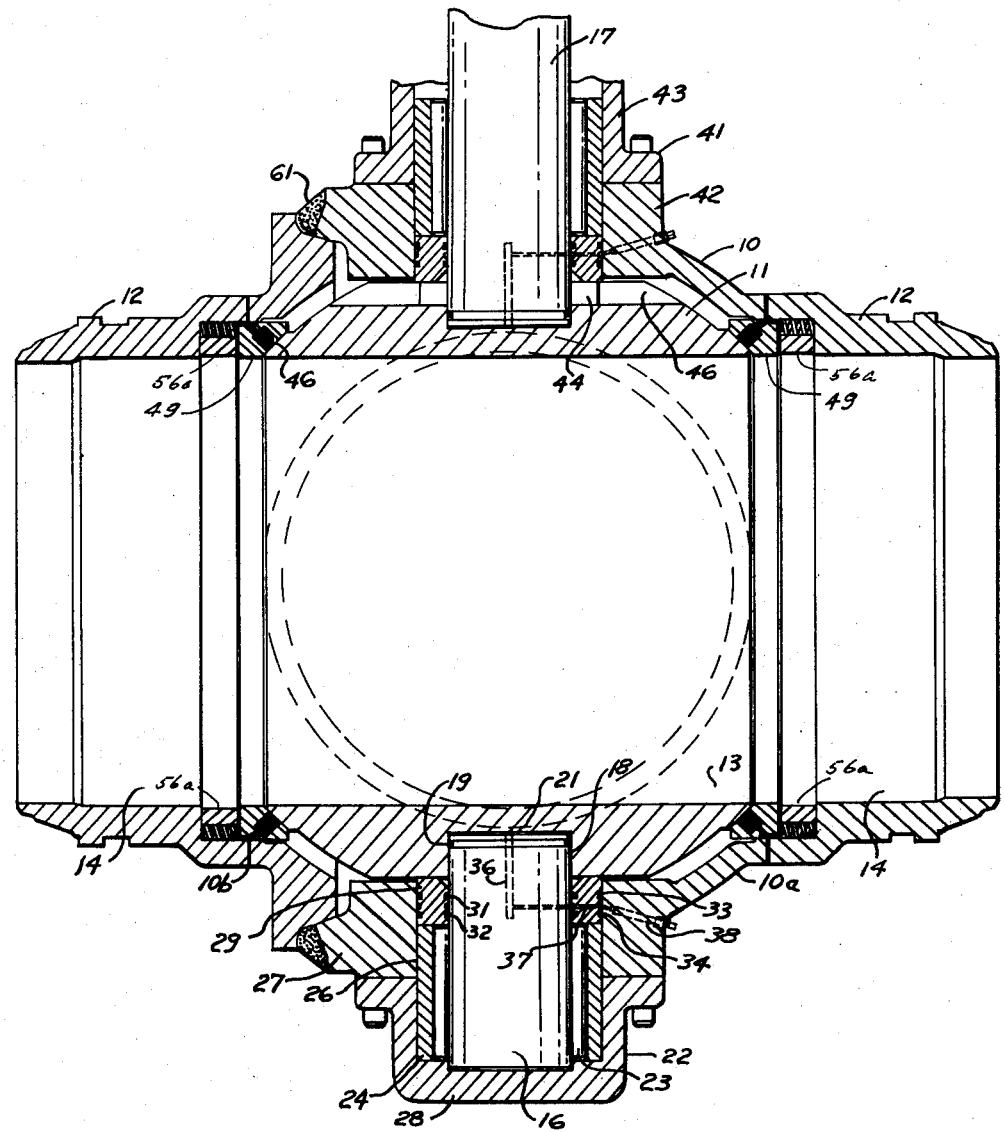
FIG_1_
INVENTOR.
MARVIN H. GROVE
BY
ATTORNEYS.

Dec. 18, 1962 M. H. GROVE 3,068,887
VALVE CONSTRUCTION HAVING PROVISIONS FOR VALVE SEAT ACCESS
Filed Aug. 24, 1960 3 Sheets-Sheet 2
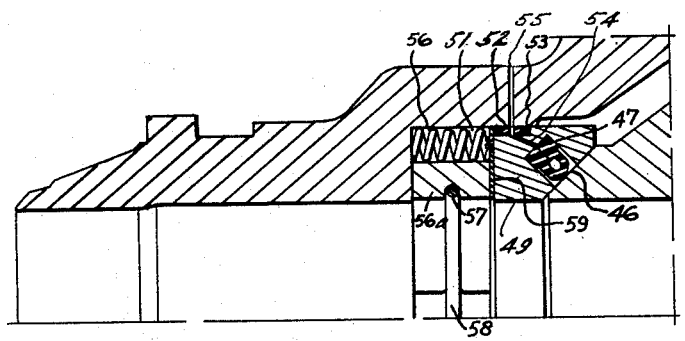
FIG_2_
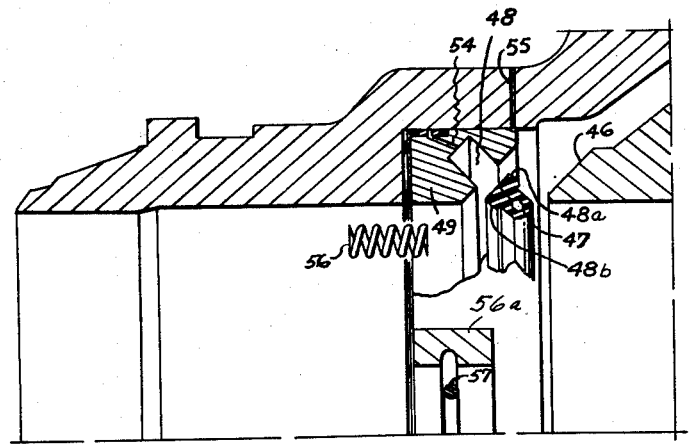
FIG_3_
INVENTOR.
MARVIN H. GROVE
BY
ATTORNEYS.

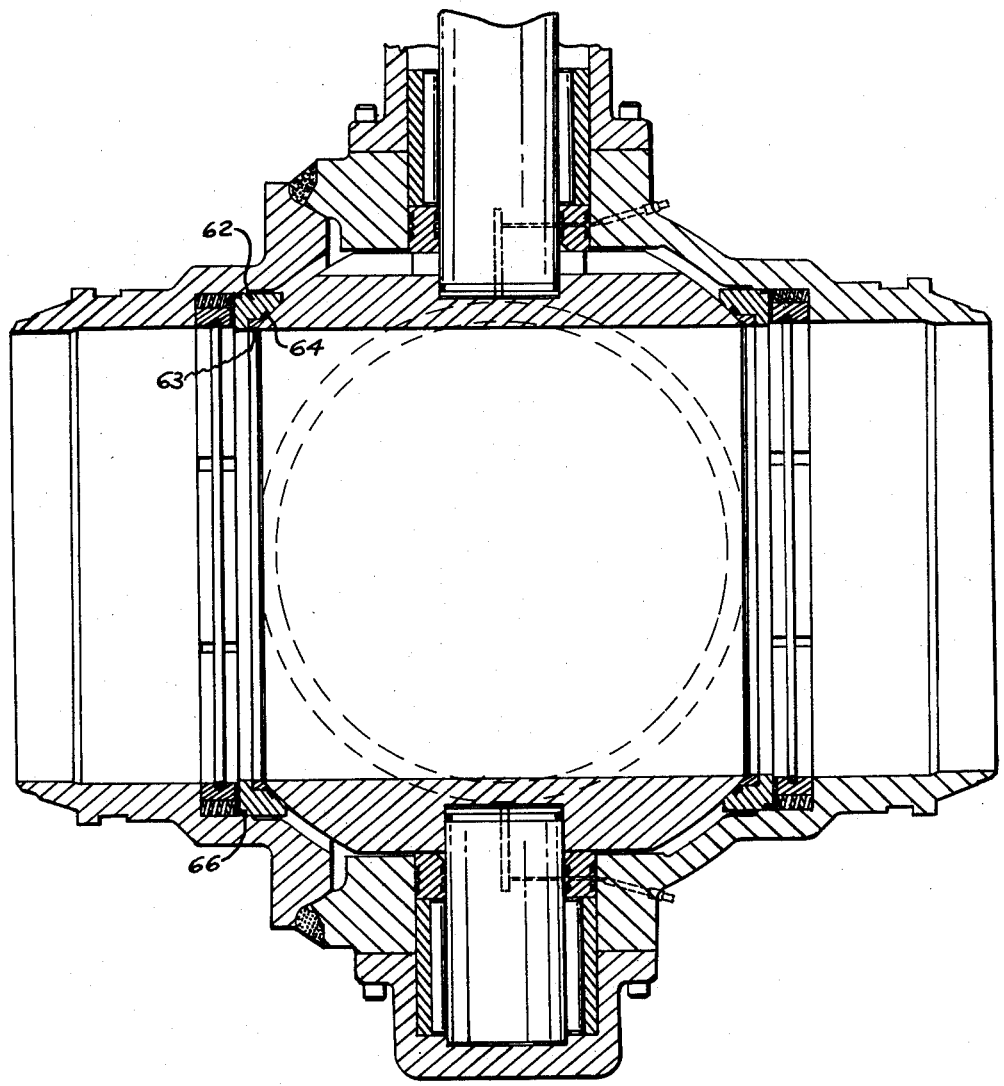
FIG_4_

United States Patent Office 3,068,887
Patented Dec. 18, 1962

3,068,887
VALVE CONSTRUCTION HAVING PROVISIONS FOR VALVE SEAT ACCESS
Marvin Henry Grove, 340 Hillside Ave., Piedmont, Calif.
Filed Aug. 24, 1960, Ser. No. 51,686
7 Claims. (Cl. 137—329.01)

This invention relates generally to valve constructions for controlling fluid flow.

In the past, valves have been made which employ resilient seal rings in contact with metal valve working surfaces. For example, large gate valves for pipe line service have been made as shown, for example, in Patent No. 2,904,306. When the seal rings of such large valves require servicing, the body, bonnet and operating gear are removed, and the gate withdrawn for access to the seal rings and the mounting springs that carry the same. For certain types of the larger valves, such as valves of the ball type, removal of the valve member presents difficulties. If the construction is such that the valve ball cannot be removed through the bonnet opening, then the body must be made in two parts which must be separated to remove the ball. A large bonnet and bonnet opening greatly increases the size and overall weight of the valve. In general, both expedients contributed to cost of manufacture and servicing difficulties.

In general, it is an object of the present invention to provide a valve construction which permits service access to the resilient seal rings without removing the valve member from the body.

A further object of the invention is to provide a ball valve construction which makes possible substantial economies in overall weight and cost of manufacture.

Another object of the invention is to provide a valve construction of the above character wherein the seal rings can be removed and applied through the flow passages, rather than through the body space.

Another object of the invention is to provide a novel ball valve construction having a ball which is journaled at both ends and balanced with respect to line pressure.

Further objects and features of the invention will appear from the following description in which the preferred embodiments have been set forth in detail in conjunction with the accompanying drawings.

Referring to the drawing:

FIGURE 1 is a side elevational view in section illustrating a ball valve incorporating the present invention.

FIGURE 2 is an enlarged detail in section illustrating the parts forming a sealed engagement between the body and the ball.

FIGURE 3 is a detail in section on an enlarged scale and exploded to illustrate the manner in which the mounting means is retracted and the seal ring removed and applied.

FIGURE 4 is a side elevational view in section illustrating another embodiment utilizing a resilient seal ring of the O-ring type.

The valve construction illustrated in FIGURE 1 consists of a valve body 10, together with the valve member 11 of the ball type. The sides of the body are extended to form the hubs 12 for making connection with associated pipeing. For the open position of the valve shown in FIGURE 1, the port 13 in the valve member is in registration with the flow passages 14, formed in the body.

The ball is journaled at both ends whereby it rotates about an axis transverse to the flow passages (i.e., vertical as illustrated in FIGURE 1). The particular journaling means illustrated employs the two aligned shafts 16 and 17. The shaft 16 is a stud shaft which terminates within the body, and its inner end is slidably fitted within a cylindrical bore or opening 18, formed in the corresponding end of the valve member. Suitable sealing means, such as a seal ring 19 of the O-ring type, serves to seal the space 21 at the inner end of the shaft 16 from the pressure within the valve body.

The shaft 16 is journaled within a bearing structure 22, which consists of a series of rollers 23 which engage the periphery of the shaft, and which are disposed within the bushing 24. The bushing is fitted within a bore 26, formed in part in the body portion 27, and in part within the caplike closure 28. An annulus or sleeve 29 is loosely fitted within the bore 26, between the inner end of the bushing 24 and the opposed end face of the ball. Sealing means of the O-ring type forms seals 31 and 32 between annulus 29 and the shaft 16, and seals 33 and 34 between the annulus and the body portion 27. It will be noted that these seals are spaced axially. Pressure equalizing ducts 36, 37 and 38 are formed, respectively, in the shaft 16, the annulus 29, and the body portion 27, whereby the space 21 at the inner end of shaft 16 is placed in communication with the atmosphere.

The bearing structure 41 for journaling the shaft 17 is constructed substantially the same as previously described in connection with the lower bearing structure for shaft 16 and identical parts have been indicated by like designating numerals. The portion corresponding to body portion 27 is designated as part 42, and the part corresponding to cap 28 as part 43. Here again the closed space at the inner end of the shaft 17 is in communication with the atmosphere. A positive driving relationship is established between the inner end of shaft 17, and the valve ball. Thus the shaft is provided with lugs 44, which are loosely accommodated within the slots 46 formed in the corresponding end of the ball. Suitable valve operating means (not shown) is connected to the exterior end of shaft 17.

It will be evident that with the journaling described above, both ends of the ball present equal fluid pressure areas to external pressure.

The ball is machined to provide the spherical valve working surface 46. This surface may extend completely about the ball for forming valve working surfaces in both open and closed positions, or if desired separate spherical valve working surfaces can be provided for full open and closed positions. The sealing means for making engagement with the valve working surface can be best understood by referring to FIGURES 2 and 3. The surface 46 is engaged by a resilient seal ring 47, which in this instance is constructed as disclosed in my copending application Serial No. 43,396, filed July 18, 1960, for Valve Construction. Normally the seal ring is accommodated within a groove 48 formed in the rigid mounting ring 49.

Various resilient materials can be used for constructing the seal ring, such as synthetic rubber or plastic. Particular reference can be made to such materials as hycar, neoprene, Kel-F, Teflon, or nylon. As disclosed in said copending application, the seal ring is molded with two base portions 48a and 48b, which are dimensioned whereby they can be pressed together and forced into the recess 48. The bent wall portion between base portions 48a and 48b, which integrally joins said base portions, is adapted to contact a valve working surface. The interior of the seal ring 47 may be hollow as illustrated, or this hollow space may be filled with a noncompressible fluid medium such as water, glycol, or a viscous latex material.

The mounting ring 49 is fitted within a counter bore 51 whereby it has some freedom of movement relative to the valve ball. Suitable means such as the seal rings 52 and 53, establish seals between the mounting ring 49 and the valve body. Ducts 54 and 55, which normally are in communication, establish pressure equalizing communication between the bottom of the recess 48, and the atmosphere. By virtue of this arrangement, line pressure acts in a direction to urge the resilient seal ring into the recess 48.

Spring means is provided, such as the circumferentially spaced coil compression springs 56 which are positioned within the recess behind the mounting ring 49, and which serve to urge the mounting ring and the resilient seal ring toward the valve ball. In addition, removable abutment means is provided whereby movement of the mounting ring under normal operation is limited, but retraction of the mounting ring permitted for servicing.

The recess 51 also serves to accommodate, behind the mounting ring 49, a filled ring 56a. This ring is made of suitable rigid material, such as metal, and preferably it is formed in a plurality of segments to facilitate its removal. The various segments can be held in place by the spring snap ring 57, which is accommodated within a groove 58 formed on the inner surface of said segments. Interposed between the compression springs 56 and the mounting ring 49, it is desirable to provide a thrust annulus or washer 59. This washer is also shown interposed between the filler ring 56a, and the mounting ring 49. It may be explained that the filler ring 56a normally does not interfere with limited movements of the mounting ring 49 such as are normally involved in the operation of the valve. However, it does restrict the mounting ring against abnormal or excessive movements.

Operation of the valve described above is as follows: The parts are all assembled in the manner illustrated in FIGURES 1 and 2. The compression springs 56 normally urge the mounting rings 49 and the seal rings 47 against the opposite sides of the valve ball. Assuming that the valve ball is in closed position, a pressure holding seal is maintained upon the upstream side. In this connection, it will be noted that the seal ring 47 seals against the ball on a radius which is substantially less than the radius upon which the seal rings 52 and 53 engage the body valve. Therefore a pressure area is presented to the line pressure, whereby when the upstream line pressure is greater than the body pressure, the differential pressure tends to urge the mounting ring toward the ball. On the downstream side such fluid pressure area is presented to the body pressure, and in instances where the body pressure is in excess of the downstream pressure, the downstream seal is retracted, thus permitting pressure equalization. The ball is rotated through 90° between full open and closed positions. In full open position the seal rings are urged against both sides of the ball. For both open and closed positions the body space can be vented to the atmosphere for proof of line seal.

Assuming that it is desired to service one of the seal rings 47, the valve is removed from the line, and the corresponding filler ring 56a removed by removing the spring snap ring 57 and the separate segments of said filler ring. Thereafter the springs 56 are removed, and then the mounting ring 49 retracted to the position shown in FIGURE 3. This serves to make the seal ring 47 accessible for servicing. FIGURE 3 indicates the seal ring being removed for replacement. After the desired servicing, the mounting ring 49 is returned to the position shown in FIGURE 2, the springs 56 returned to their normal positions, and the filler ring 56a reassembled and positioned as in FIGURE 2.

The features just described make it possible to service the seal rings without taking the ball from the body. As a further feature, the body is shown formed in two sections 10a and 10b, which are made as separate castings, and which in the manufacture of the valve are permanently welded together by the weld connection 61. With this construction, the usual bolting of the two body parts together is eliminated. It will be evident that the weld connection 61 is applied after the ball and other working parts of the valve have been machined and assembled in conjunction with the body part 10a. Thereafter the machined body part 10b is applied by the weld connection 61.

The embodiment of FIGURE 4 is similar in many respects to the embodiment described above, and like parts have been given like numerals. However, the resilient seal ring in this instance is of the O-ring type, and the mounting means for each O-ring includes the mounting ring 62, together with the loosely fitted seat ring 63. These two parts are formed to provide a groove or recess for accommodating the resilient seal ring 64 of the O-ring type. These parts are similar to corresponding parts disclosed in Patent No. 2,810,543. A single seal 66 of the O-ring type is provided for forming a seal between the mounting ring 62 and the body.

It will be evident from the foregoing that I have provided a valve that can be made in larger sizes, and which can be serviced with respect to the resilient seal rings, without removing the valve member from the body. The above described integral body construction greatly simplifies manufacture and makes possible substantial economies in cost of manufacture.

I claim:

1. In a valve construction, a body formed to provide flow passages and a body space between the passages, said body having an annular recess therein adjacent and open toward said body space and of a greater diameter than that of said flow passages, a valve member within the body space and movable between open and closed positions relative to the flow passages, said valve member having a valve working surface formed thereon, a seal ring adapted to contact and seal upon said valve working surface, a ringlike mounting means for said seal ring positioned within said recess and movable axially therein away from and towards said valve member, the axial length of said ringlike mounting means being less than the axial length of said annular recess and the outer diameter of said ringlike mounting means corresponding to the outer diameter of said annular recess, means forming a fluid tight seal between the mounting means and the outer wall defining the annular recess in said valve body, and removable abutment means carried by the valve body and mounted within said recess for limiting axial movement of the ringlike mounting means in a direction away from the valve member, said mounting means being retractable in said recess for service access to the seal ring upon removing said abutment means without removal of said ringlike mounting means.

2. A valve construction as defined in claim 1 wherein the annular recess in the valve body has a radially extending rear wall spaced outwardly from the valve member, which rear wall forms an annular abutment surface for the removable abutment means when said last-mentioned means is in position within said annular recess.

3. A valve construction as in claim 2 in which said removable abutment means is disposed within said annular recess and between said ringlike mounting means and said annular abutment surface formed by the radially extending rear wall defining said recess.

4. A valve construction as defined in claim 3 wherein the removable abutment means is an annular member having an external diameter less than that of the diameter of the outer wall of said annular recess to provide an annular space between the exterior of said removable abutment means and said outer wall, and wherein spring means is interposed within said space and between said annular abutment surface and said ringlike mounting means for urging the latter toward said valve member.

5. A valve construction as defined in claim 4 wherein the removable abutment means constitutes a plurality of segments, and wherein means are provided for detachably retaining said segments in annular form within said annular recess.

6. A valve construction as defined in claim 5 wherein the means for detachably retaining said segments in annular form consists of a removable spring snap ring engaging the inner surface of said segments.

7. A valve construction as defined in claim 6 wherein the inner surfaces of said segments are provided with circumferentially extending grooves and wherein said removable spring snap ring engages within said grooves to retain said segments in annular form within the annular recess formed in the valve body.

References Cited in the file of this patent

UNITED STATES PATENTS

| | | |
|---|---|---|
| 1,252,490 | Peris | Jan. 8, 1918 |
| 2,734,715 | Knox | Feb. 14, 1956 |
| 2,819,868 | Cauffman | Jan. 14, 1958 |
| 2,877,979 | Snyder | Mar. 17, 1959 |
| 2,890,017 | Shafer | June 9, 1959 |
| 2,963,260 | Siravo | Dec. 6, 1960 |
| 2,963,262 | Shafer | Dec. 6, 1960 |
| 2,973,182 | Gill | Feb. 28, 1961 |